United States Patent
Kaneko

(10) Patent No.: US 8,471,666 B2
(45) Date of Patent: Jun. 25, 2013

(54) COIL BOBBIN, COIL COMPONENT AND SWITCHING POWER SOURCE APPARATUS

(75) Inventor: Kouji Kaneko, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/440,674

(22) Filed: Apr. 5, 2012

(65) Prior Publication Data

US 2012/0257419 A1    Oct. 11, 2012

(30) Foreign Application Priority Data

Apr. 8, 2011    (JP) ................ P2011-086623

(51) Int. Cl.
  *H01F 27/30*    (2006.01)
(52) U.S. Cl.
  USPC .......................................... 336/198
(58) Field of Classification Search
  USPC ................... 336/192, 196, 198, 200, 206
  See application file for complete search history.

(56) References Cited

U.S. PATENT DOCUMENTS

| | | | |
|---|---|---|---|
| 7,408,436 B2 * | 8/2008 | Ikezawa | ................... 336/208 |
| 7,924,133 B2 | 4/2011 | Kaneko | |
| 7,948,344 B2 | 5/2011 | Kaneko | |
| 2010/0039207 A1 * | 2/2010 | Kaneko | ................... 336/221 |

FOREIGN PATENT DOCUMENTS

| | | |
|---|---|---|
| JP | A-2003-272933 | 9/2003 |
| JP | A-2004-303857 | 10/2004 |
| JP | A-2005-217311 | 8/2005 |
| JP | A-2010-45187 | 2/2010 |
| JP | A-2010-45188 | 2/2010 |

OTHER PUBLICATIONS

Apr. 16, 2013 Office Action issued in Japanese Application No. 2011-086623 (English Translation only).

* cited by examiner

*Primary Examiner* — Tuyen Nguyen
(74) *Attorney, Agent, or Firm* — Oliff & Berridge, PLC

(57) ABSTRACT

To improve insulating properties of a coil winding having three turns. In a coil bobbin, insulation between mutually adjacent winding members of a first coil winding are achieved by a projecting section. Furthermore, the first coil winding and the second coil winding are insulated from each other by the flange section. Moreover, the projecting sections and the projecting sections are respectively provided in positions at either end when the first coil winding and the second coil winding are viewed in a direction perpendicular to the direction of the axis line. Consequently, even with coil windings having three turns, insulation between the windings is achieved by means of this coil bobbin, and furthermore, insulation is also achieved in the region outside the coil windings as viewed in a direction perpendicular to the axis line direction, thereby making it possible to improve the insulating properties without increasing the number of parts.

5 Claims, 18 Drawing Sheets (a)

(b)

(a)

(b)

(a)

(b)

(a)

(b)

COIL BOBBIN, COIL COMPONENT AND SWITCHING POWER SOURCE APPARATUS

BACKGROUND OF THE INVENTION

1. Field of the Invention

The present invention relates to a coil bobbin, a coil component and a switching power source apparatus.

2. Related Background Art

Coils formed with a plurality of coil windings having two turns, for instance, are being used increasingly in switching power source devices which are incorporated into a charger for a vehicle-mounted battery. In response to this, Japanese Patent Application Publication No. 2010-45188, for example, discloses a coil bobbin provided with a projecting section that projects outwards from an external circumferential surface of a tubular main body section, so as to avoid contact and shorting between coil windings having two turns.

In recent years, the use of coils having three or more turns has increased with the object of improving the output current. In this case, in order to improve insulating properties between mutually adjacent windings, a method of providing insulating members respectively between the windings is used, for instance. However, if the number of parts increases, then the number of steps involved in coil assembly also increases.

SUMMARY OF THE INVENTION

The present invention was devised in view of the foregoing, an object thereof being to provide a coil bobbin whereby insulating properties between coil windings having three turns can be improved, without increasing the number of parts, and to provide a coil component and a switching power source device using this coil bobbin.

In order to achieve the aforementioned object, the coil bobbin relating to one aspect of the present invention is an insulating coil bobbin having a tubular section about which two conductive coil windings are wound, this coil bobbin further having: a flat-shaped flange section which projects outwards from substantially a central portion of the tubular section in a plane which is perpendicular to an axis line of the tubular section; a first projecting section which projects toward outside from the tubular section with respect to the axis line at a position separated from the flange section, the first projecting section projecting further toward outside than a first coil winding, which has two or more turns, of the two coil windings, when the first coil winding is wound on a first end side, this first end side being one end side of the tubular section as divided by the flange section and being the side where the first coil winding is wound; a second projecting section, which is provided so as to be sandwiched between adjacent windings when the first coil winding is wound on the first end side and which projects toward outside from the tubular section with respect to the axis line, in a direction different from the first projecting section when viewed in the axis line direction; and a third projecting section which projects toward outside from the tubular section with respect to the axis line at a position separated from the flange section, the third projecting section projecting further toward outside than a second coil winding, which is different from the first coil winding, of the two coil windings, and which has one or more turns, when the second coil winding is wound on a second end side, this second end side being a different end side from the first end side of the tubular section and being a side where the second coil winding is wound.

According to the coil bobbin described above, mutually adjacent winding wires of the first coil winding which has two or more turns are insulated by the second projecting section. Furthermore, the first coil winding and the second coil winding, which has one or more turns, are insulated from each other by the flange section. Moreover, the first projecting section and the third projecting section are provided in positions at either end of the first coil winding and the second coil winding when viewed in a direction perpendicular to the axis line direction. In this way, according to the coil bobbin described above, even with coil windings having three turns, insulation between the winding wires is achieved by means of this coil bobbin, and furthermore, insulation is also achieved in the region outside the coil windings as viewed in a direction perpendicular to the axis line direction, thereby making it possible to improve the insulating properties without increasing the number of parts.

Here, it is possible to adopt a mode in which the flange section has an outer diameter larger than an outer diameter of the coil windings, and comprises a side wall section extending in the axis line direction from an outer circumferential edge thereof.

As described above, by making the flange section larger than the outer diameter of the coil windings and providing a side wall section which extends in the direction of the axis line from the outer circumferential edge, then it is possible to achieve insulating properties between the coil windings and members such as the magnetic core members, and the like, provided to the outside thereof, as well as achieving stability when installing the coil windings on the coil bobbin.

Furthermore, it is also possible to adopt a mode in which a height of a side wall section in the axis line direction is greater than a thickness of a coil winding provided in the direction in which the side wall section extends, and the side wall section further has a hook section which extends in the axis line direction from an end of the side wall section that is different from the end on the side of the flange section.

By providing a hook section extending in the axis line direction from the side wall section as described above, the hook section presses in the coil winding which is provided in the direction of extension of the side wall section, when viewed in a direction perpendicular to the axis line direction, and therefore vibration of the coil winding in the axis line direction with respect to the coil bobbin can be suppressed and insulating properties can be improved.

Furthermore, it is also possible to adopt a mode comprising rotation restricting means for restricting rotation in one direction of the coil winding, by abutting against the coil winding when the coil winding is inserted into the tubular section and rotated.

By providing rotation restricting means for restricting rotation of the coil winding in one direction, it is possible to prevent the coil winding from contacting other components, for example, due to rotating about the circumference of the tubular section of the coil bobbin, and therefore the insulating properties of the coil winding can be improved.

Here, it is also possible to adopt a mode which further comprises reversal restricting means for restricting rotation of the coil winding in a reverse direction at a position where rotation of the coil winding in the one direction has been restricted by the rotation restricting means.

By providing reversal restricting means which restricts rotation in the opposite direction to the rotation in the one direction, as described above, rotation of the coil winding in the reverse direction is also suppressed and the coil winding can be fixed more securely at a prescribed position.

The coil component relating to one aspect of the present invention comprises: the coil bobbin described above; a first coil winding which is wound in two or more turns about the axis line; a second coil winding which is wound in one or more turns about the axis line; a connecting member which connects one end section of the first coil winding with one end section of the second coil winding; and a pair of magnetic core members which sandwich the coil windings in the axis line direction. In this case, it is possible to obtain a coil component having raised insulating properties, without raising the number of parts, using a coil winding having three or more turns in which a first coil winding and a second coil winding are connected by a connecting member.

Moreover, the switching power source apparatus relating to the present invention comprises the coil component described above. In this case, it is possible to obtain a switching apparatus having raised insulating properties using a coil winding of three turns, without increasing the number of parts.

According to the present invention, a coil bobbin which can improve the insulating properties of coil windings having three turns, a coil component using this coil bobbin, and a switching power source apparatus, are provided.

Figure 1:
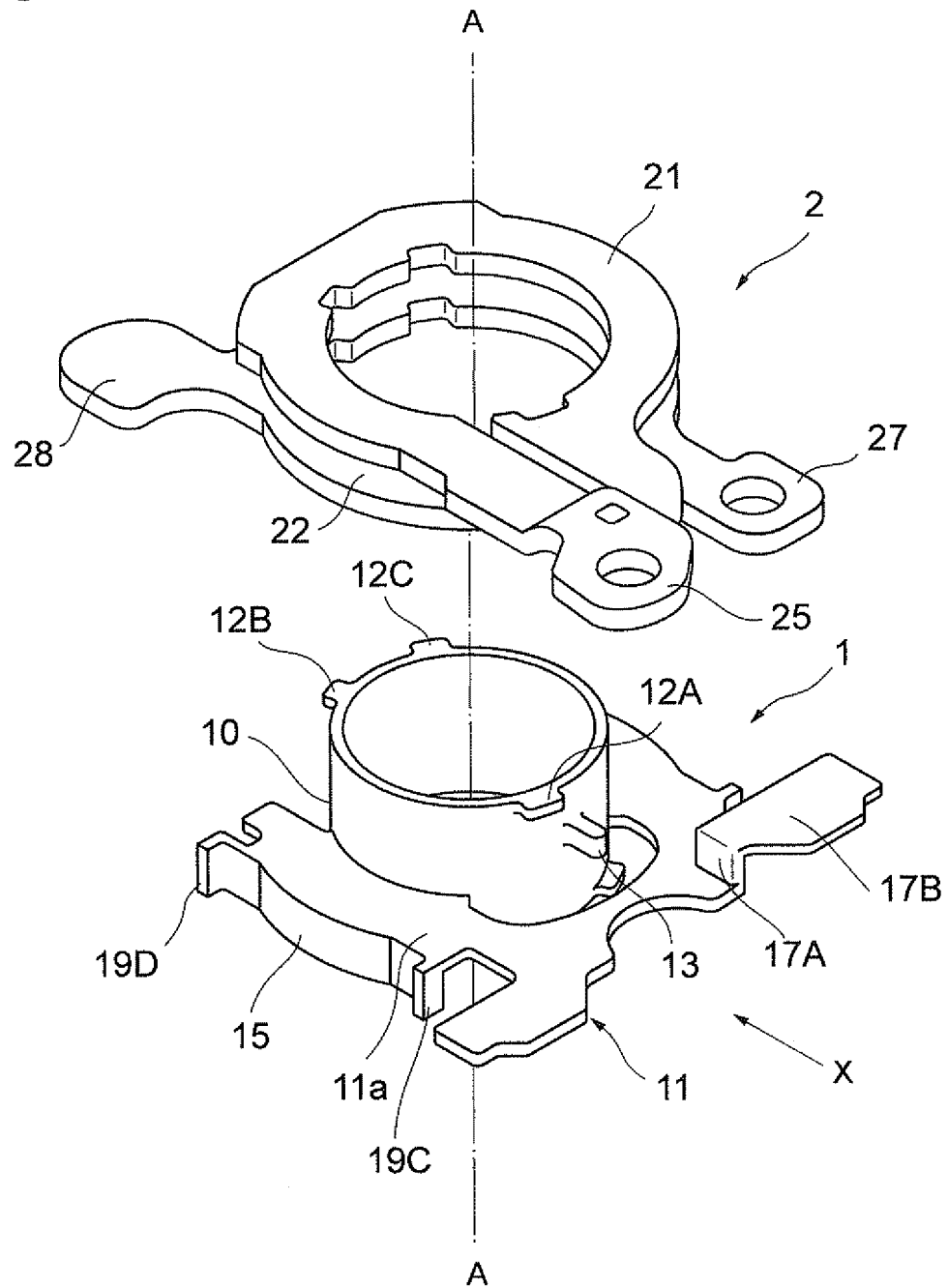
FIG. 1 is an exploded perspective diagram showing a coil bobbin relating to an embodiment of the present invention, and a first coil winding which is installed on the coil bobbin.
Figure 3:
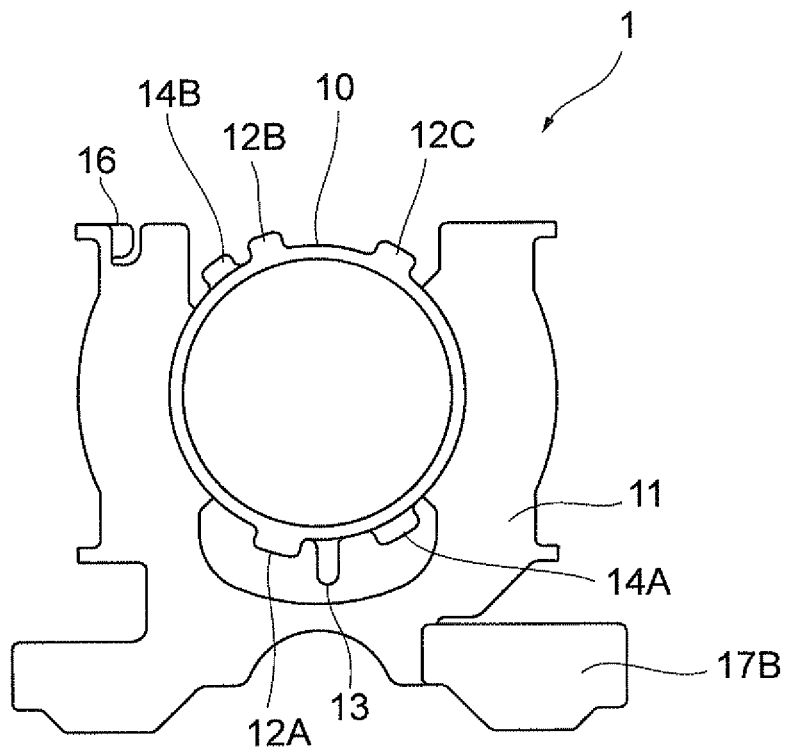
Figure 3:
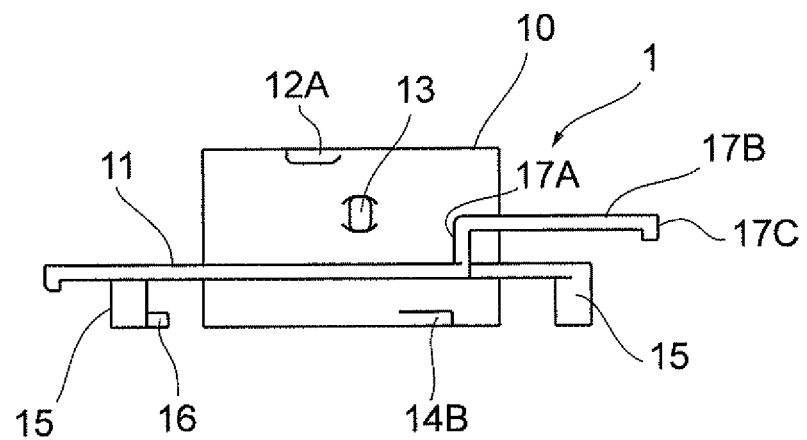
Figure 4:
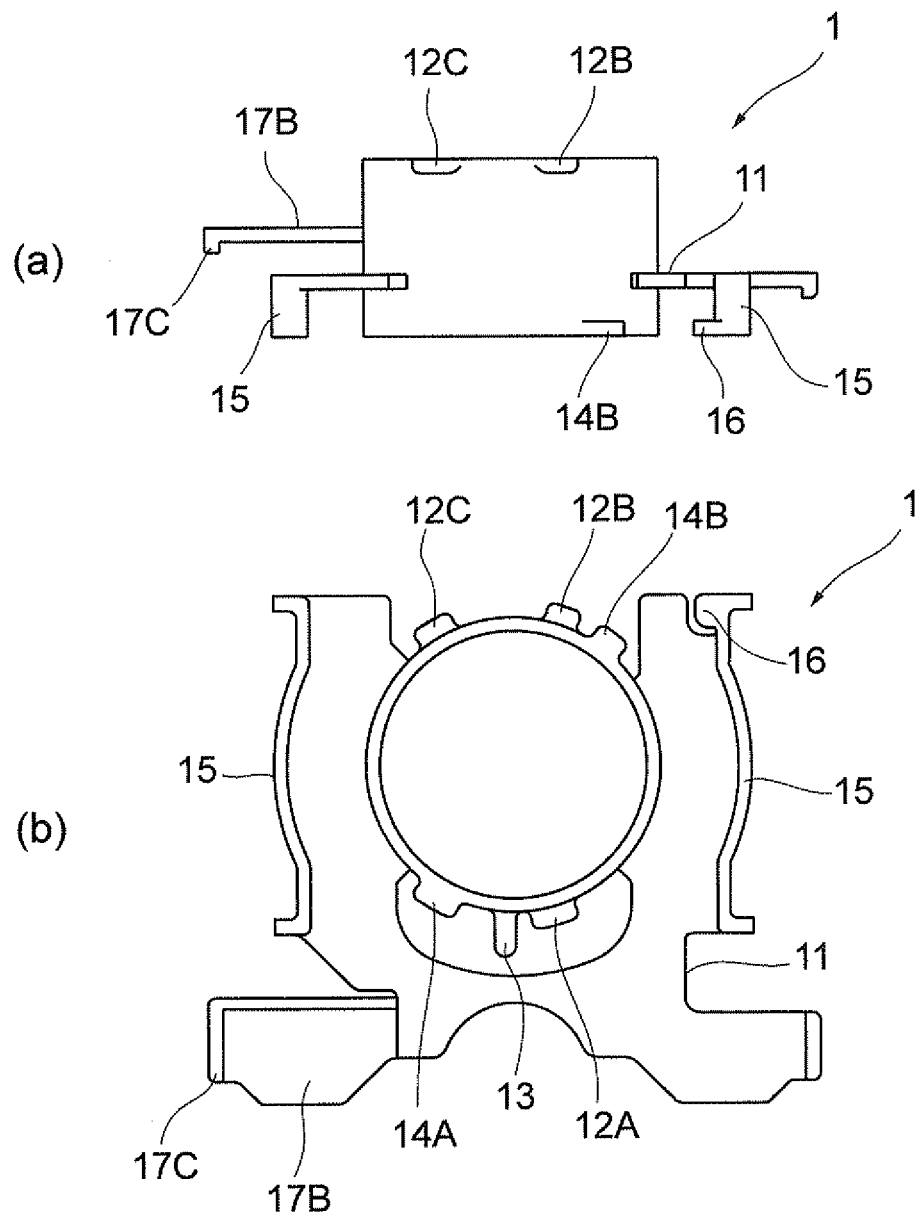
Figure 5:
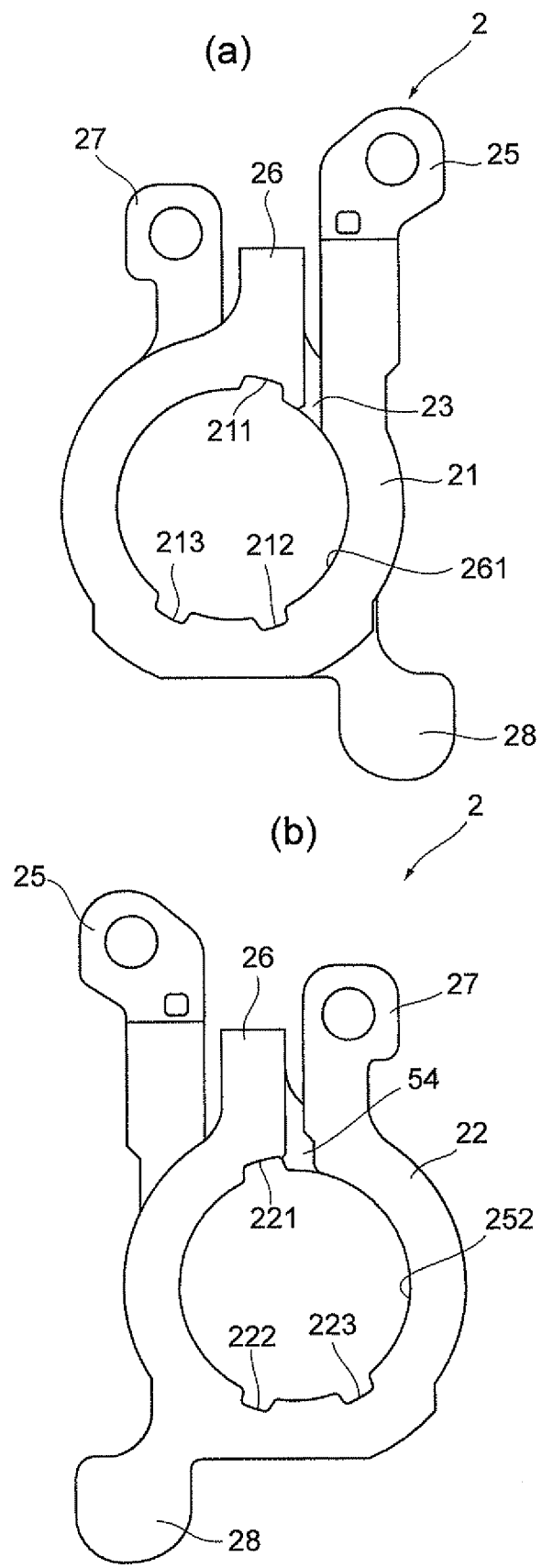
Figure 6:
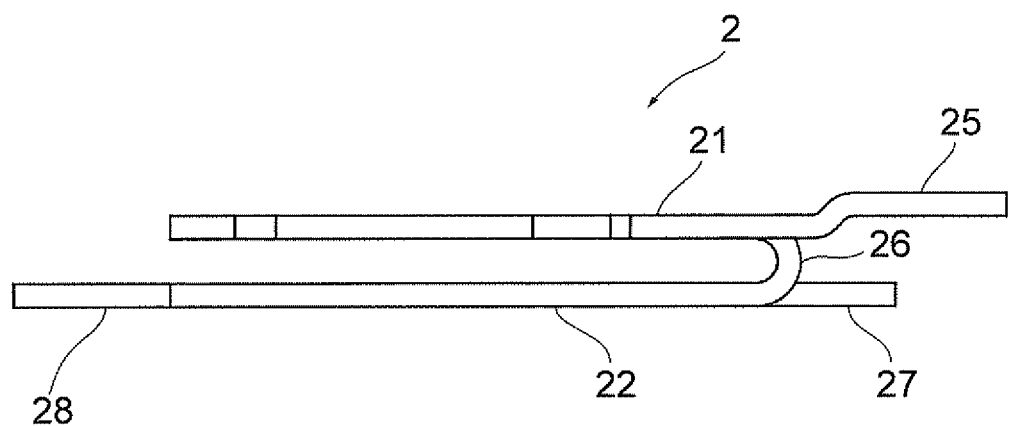
Figure 7:
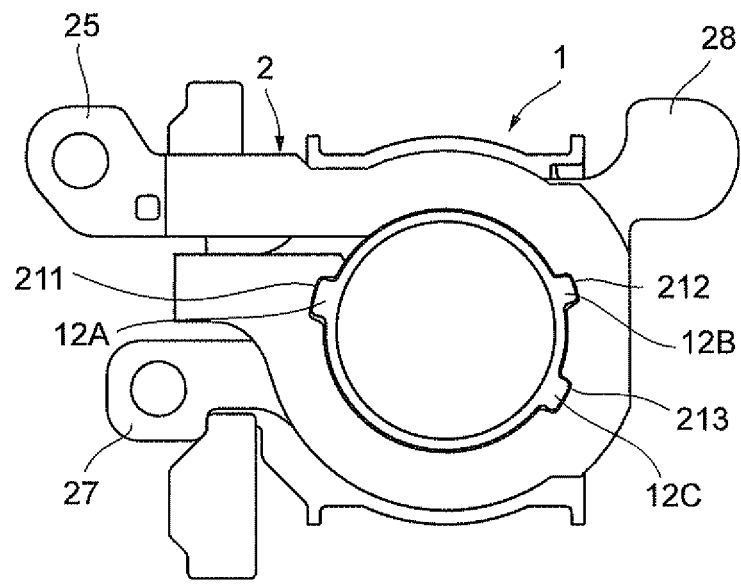
Figure 7:
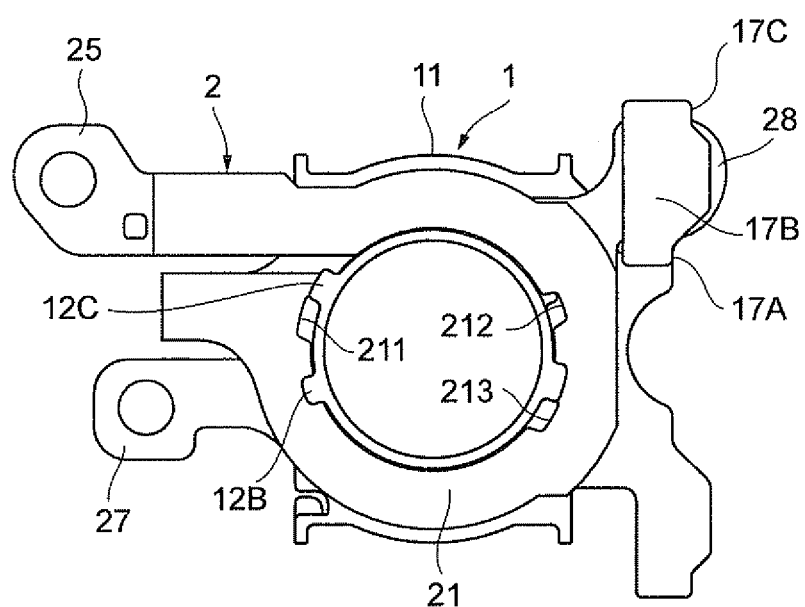
Figure 8:
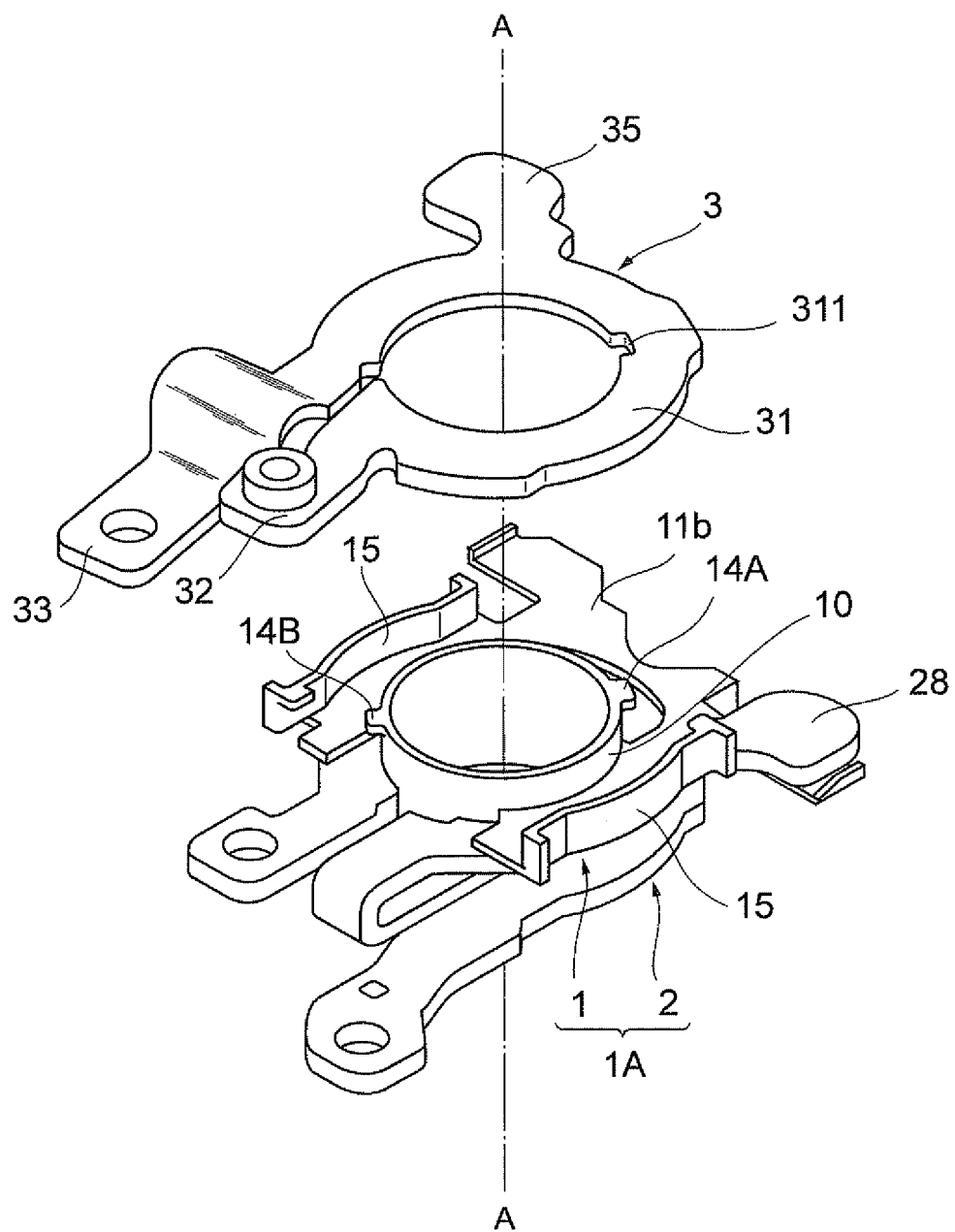
Figure 9:
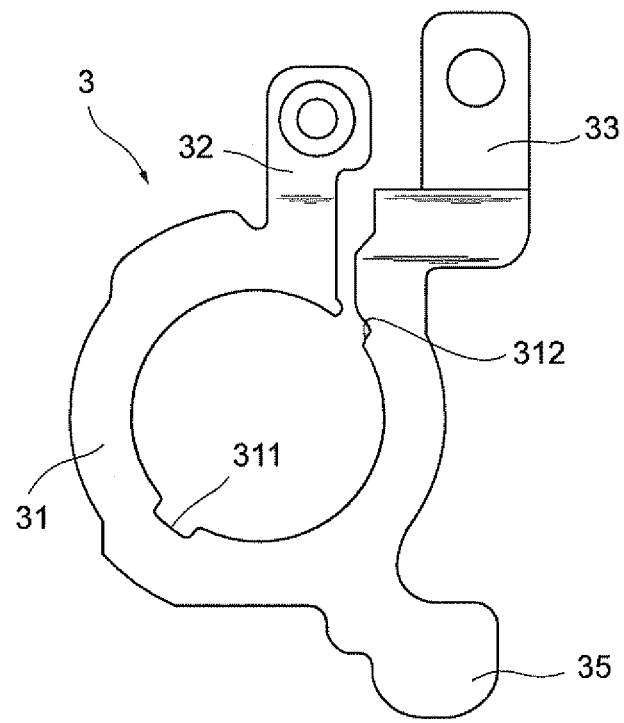
Figure 9:
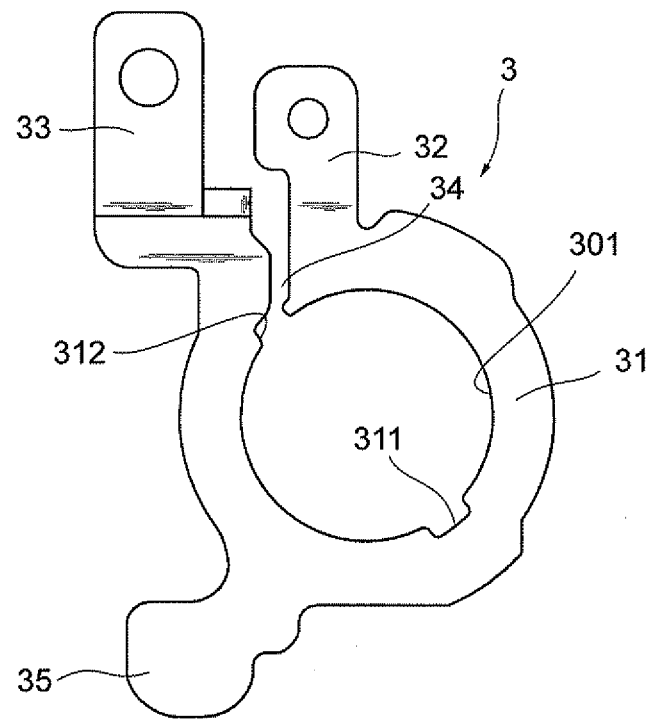
Figure 10:
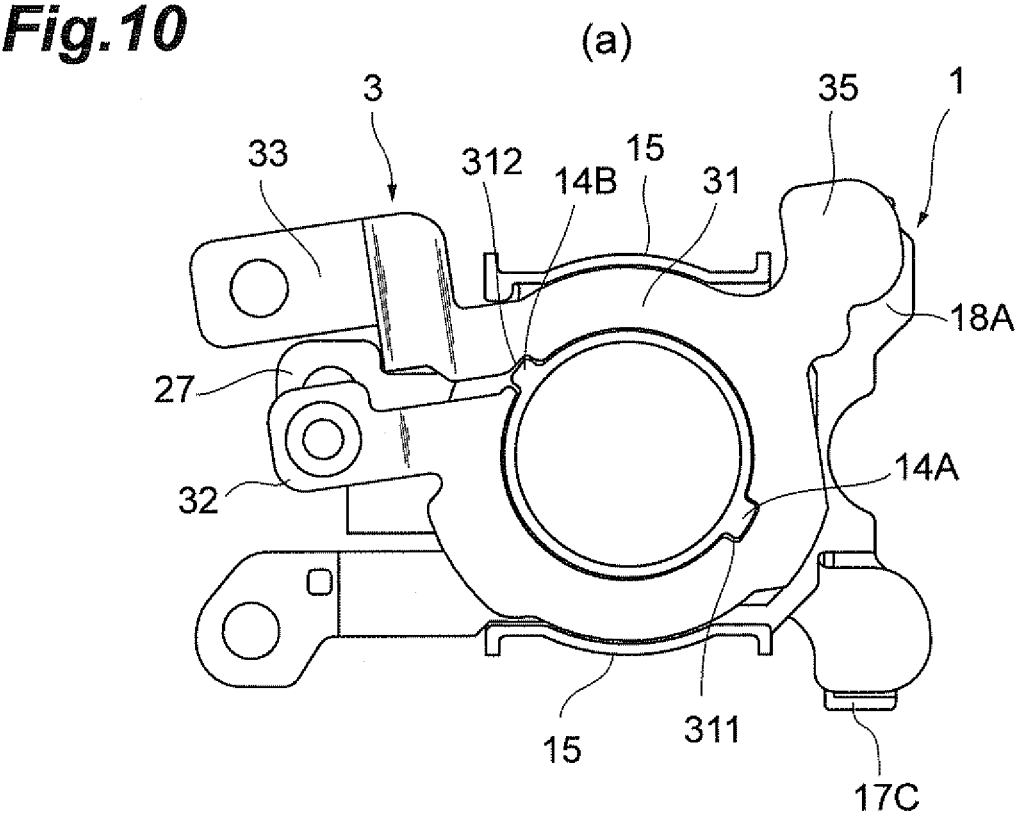
Figure 10:
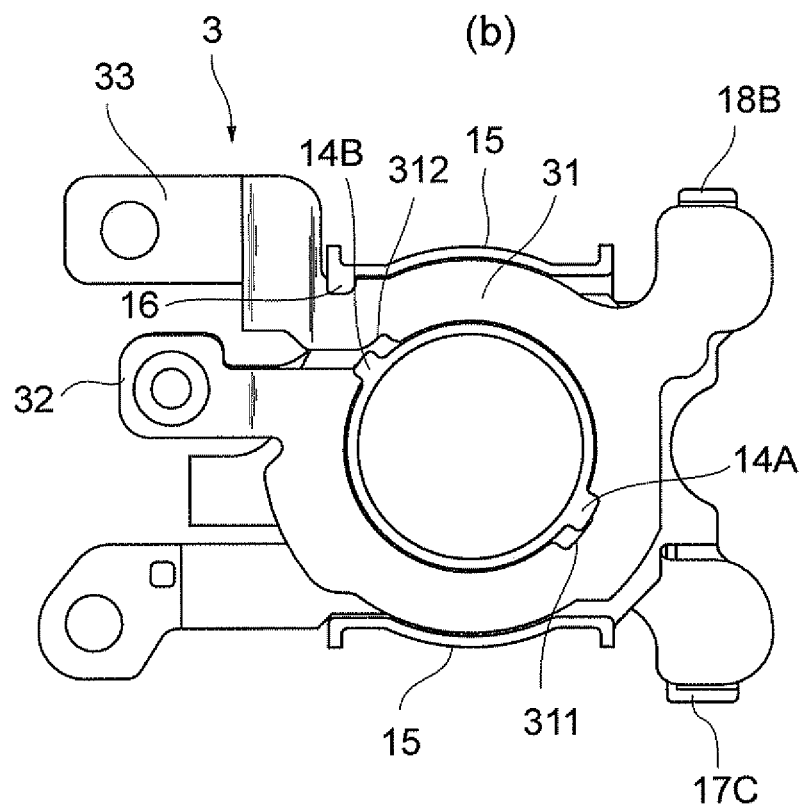
Figure 11:
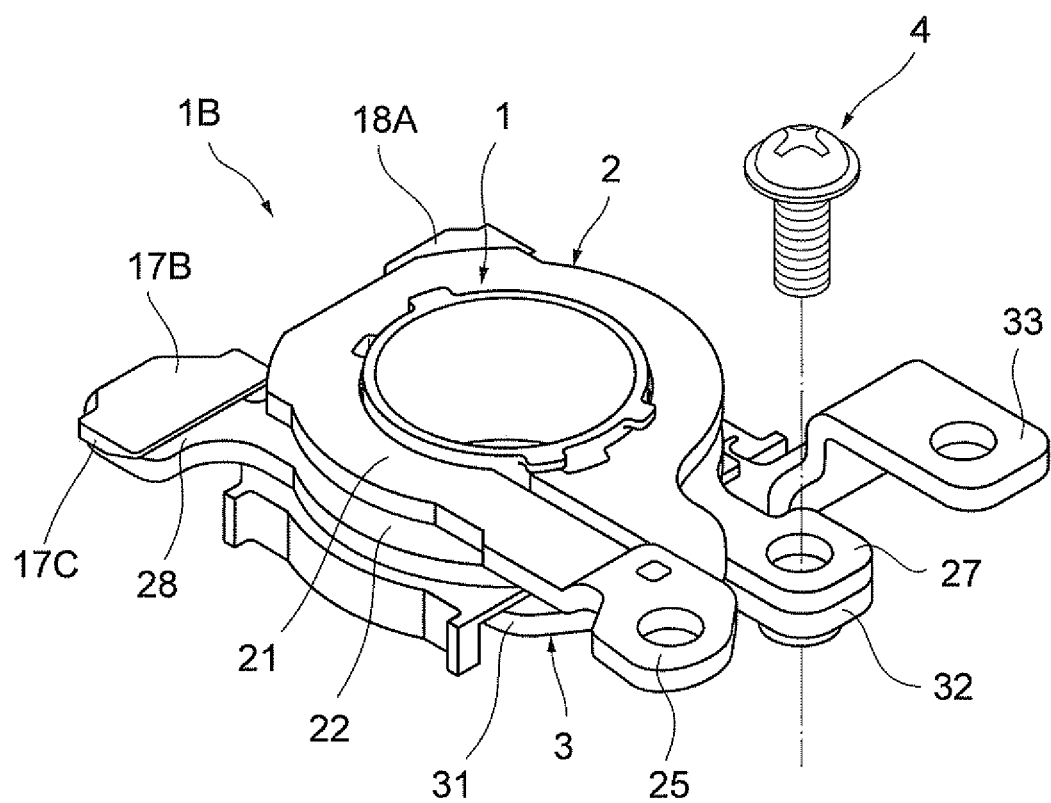
Figure 12:
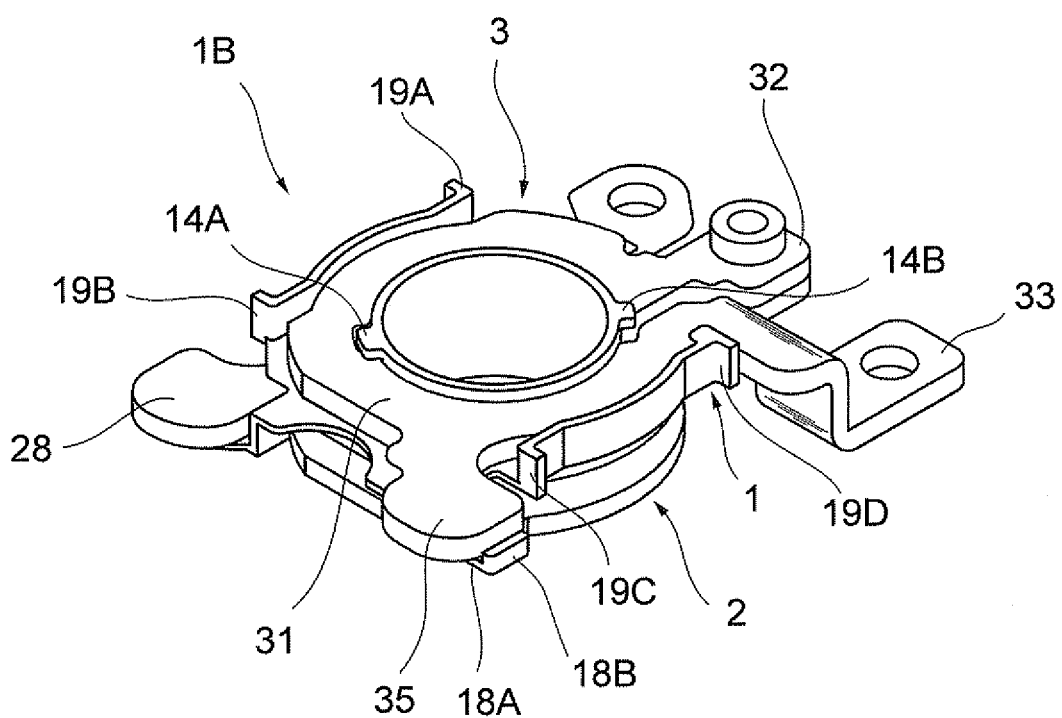
Figure 13:
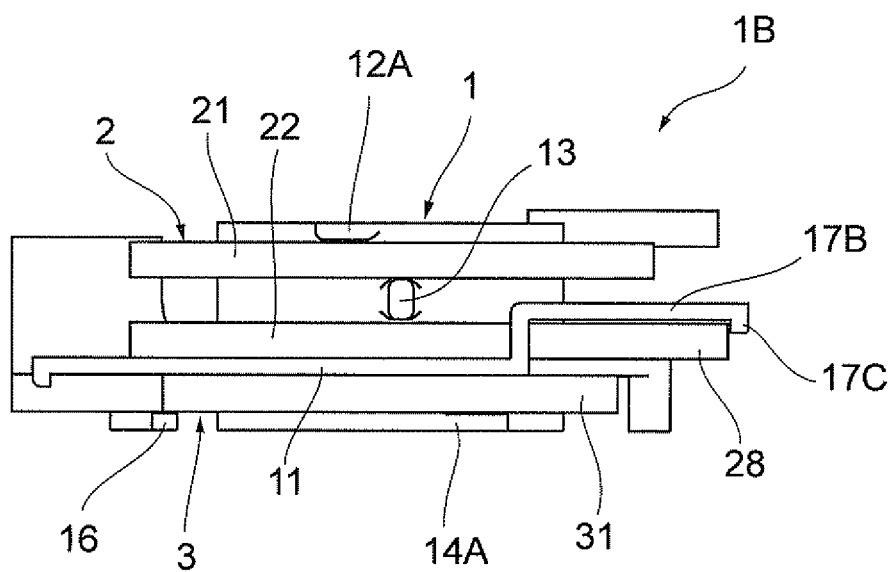
Figure 14:
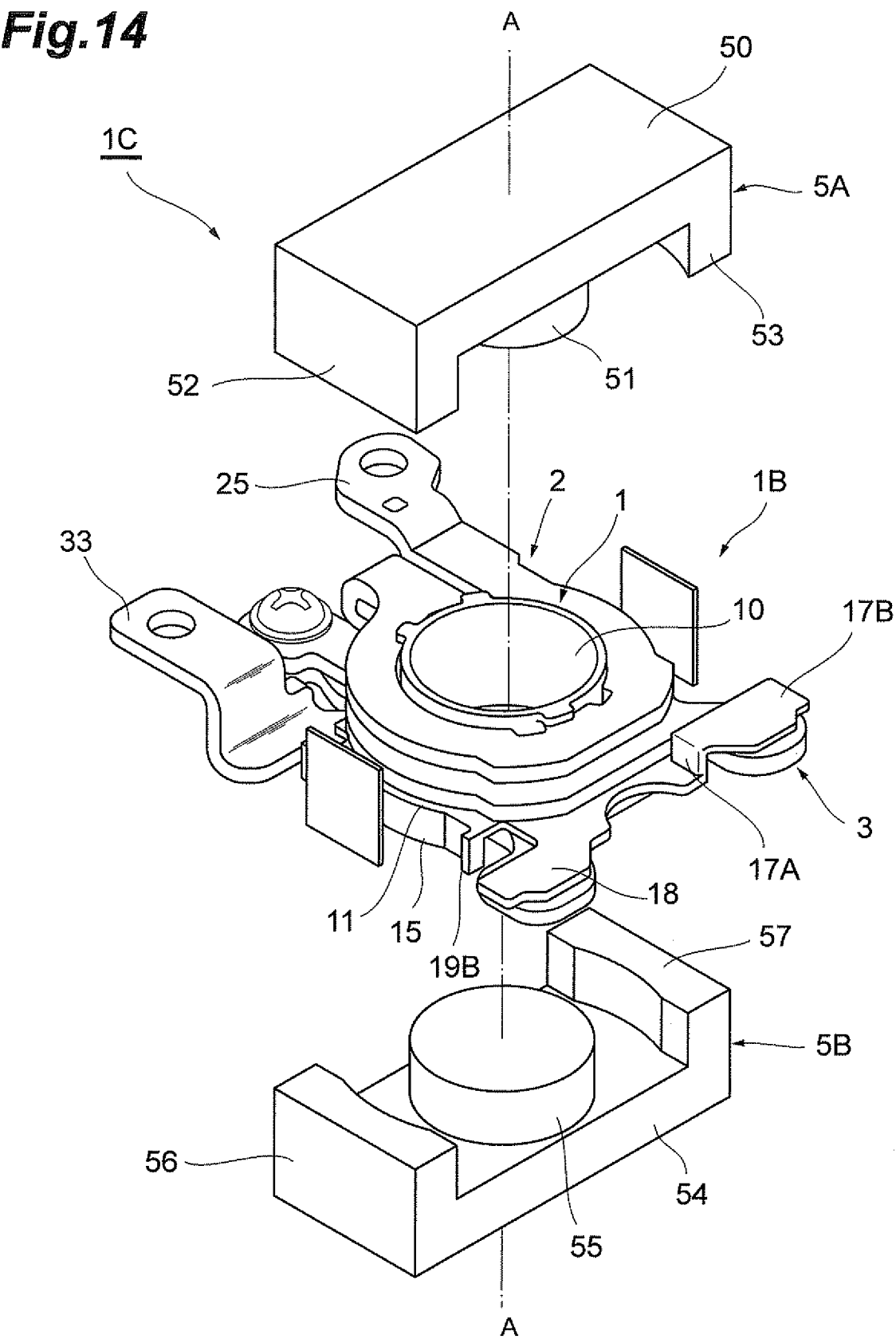
Figure 15:
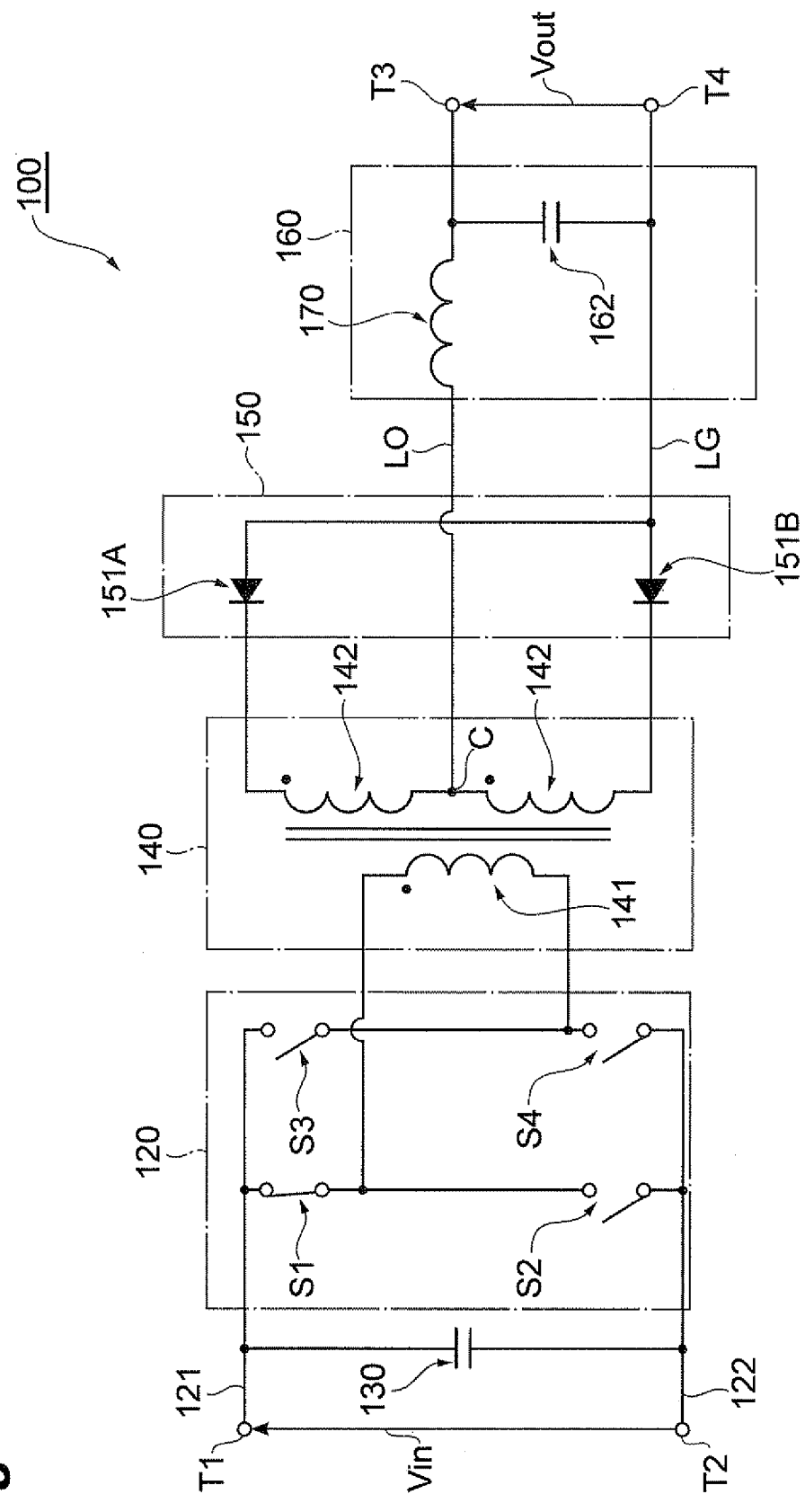
Figure 16:
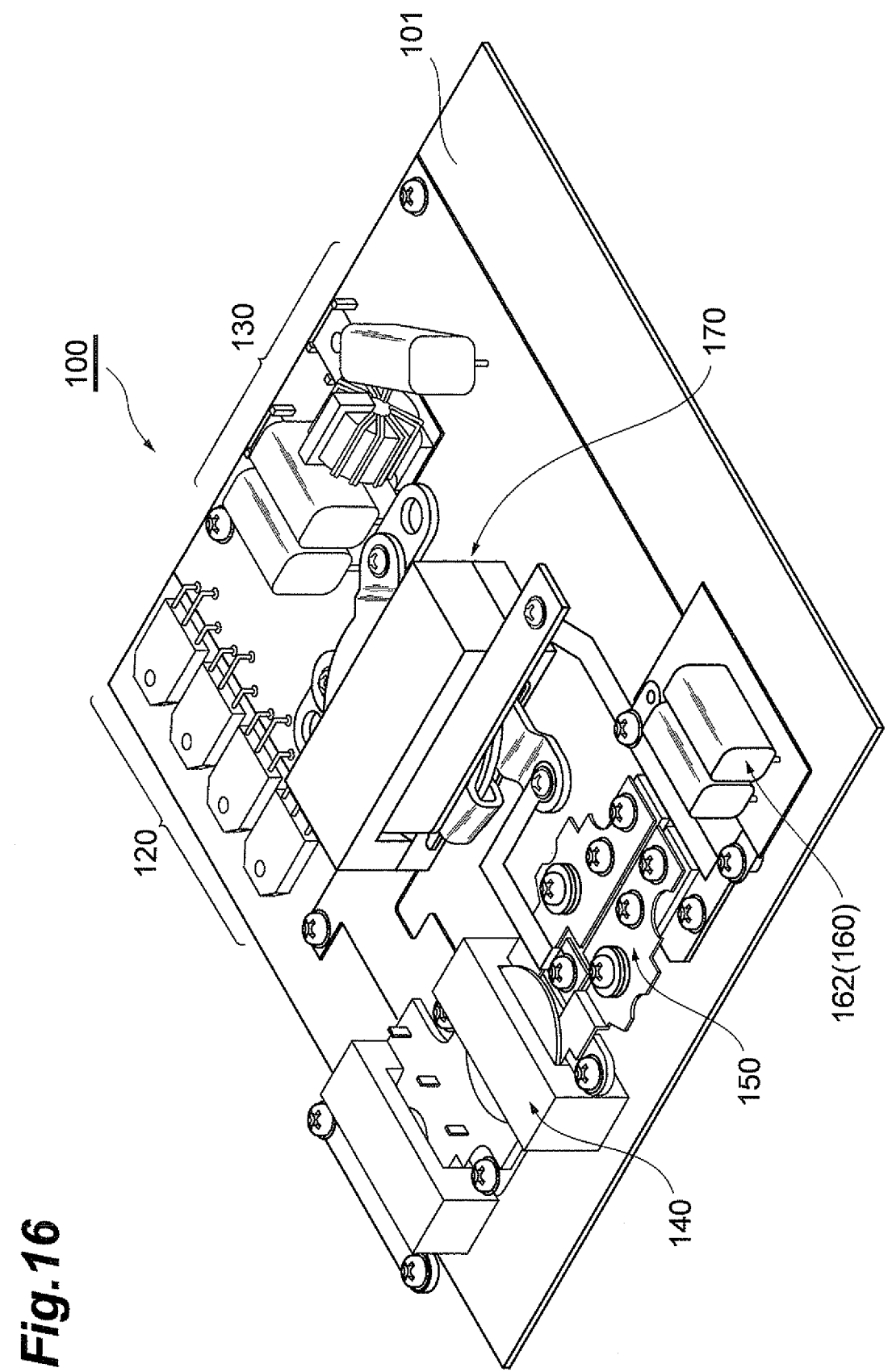
Figure 17:
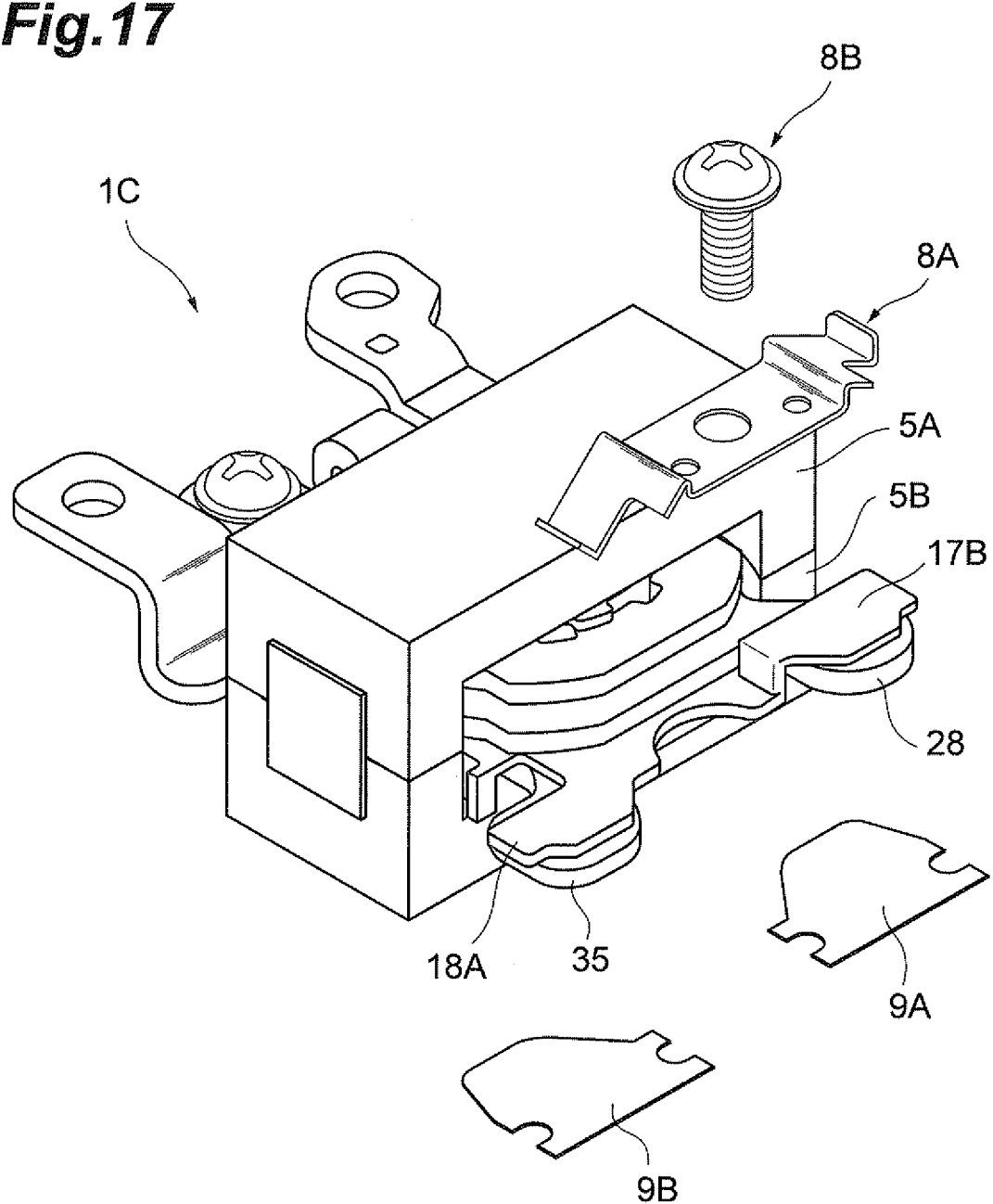
Figure 18:
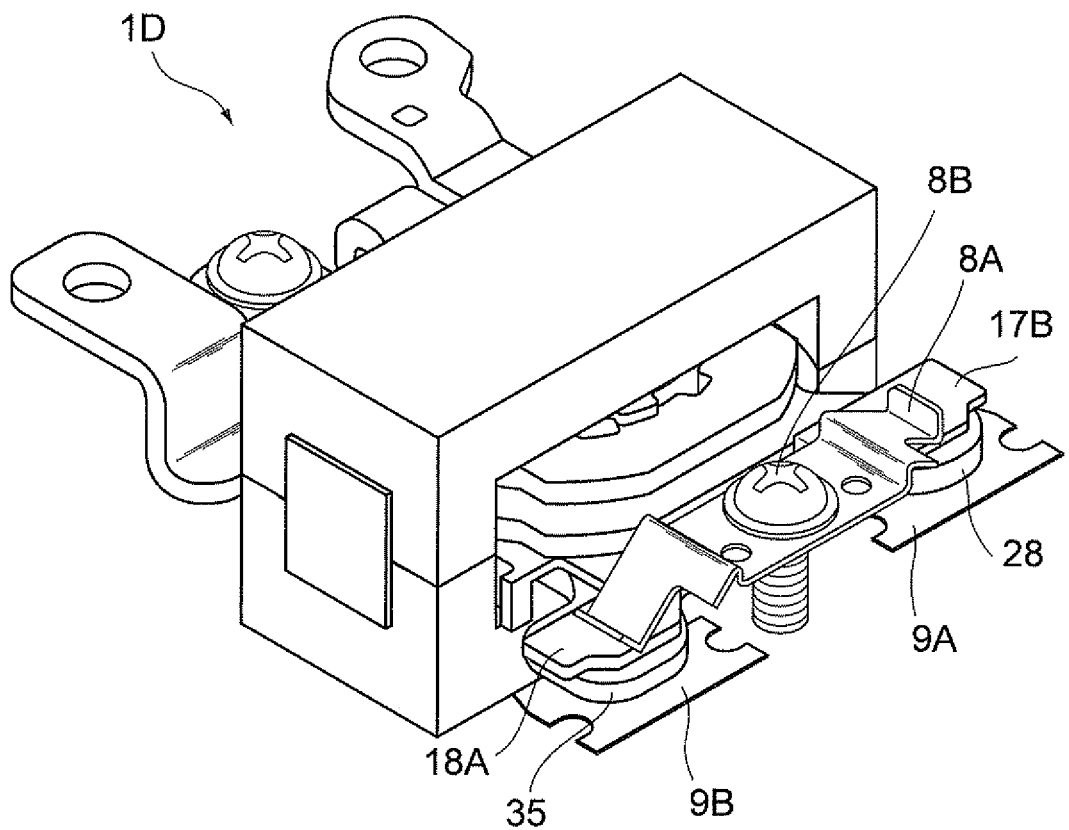

(a) of FIG. 3 is a plan diagram of a coil bobbin, and (b) of FIG. 3 is a front view diagram of a coil bobbin (a diagram viewed from the X direction in FIG. 1);

(a) of FIG. 4 is a bottom surface diagram of a coil bobbin and (b) of FIG. 4 is a rear surface diagram of a coil bobbin;

(a) of FIG. 5 is a plan diagram of a first coil winding in FIG. 1 and (b) of FIG. 5 is a bottom surface diagram of a first coil winding;

FIG. 6 is a side view diagram of a first coil winding;

FIG. 7 is a diagram for describing a method of installing a first coil winding on a coil bobbin;

FIG. 8 is a diagram for describing the composition of a part obtained by installing a first coil winding on a coil bobbin, and a second coil winding;

(a) of FIG. 9 is a plan diagram of a second coil winding and (b) of FIG. 9 is a bottom surface diagram of a second coil winding;

FIG. 10 is a diagram for describing a method of installing a second coil winding on a part constituted by a coil bobbin and a first coil winding;

FIG. 11 is a diagram for describing a method of connecting a first coil winding and a second coil winding;

FIG. 12 is a perspective diagram of a bottom surface side of a coil consisting of a coil bobbin, a first coil winding and a second coil winding;

FIG. 13 is a front view diagram of a coil (as viewed in the X direction in FIG. 1);

FIG. 14 is an exploded perspective diagram for illustrating the composition of a coil component;

FIG. 15 is a circuit diagram of a switching power source apparatus;

FIG. 16 is a perspective diagram of a switching power source apparatus;

FIG. 17 is an exploded perspective diagram of a case where a heat radiating member is installed on a coil component; and FIG. 18 is a perspective diagram of a coil component in which a heat radiating member is installed.

DESCRIPTION OF THE PREFERRED EMBODIMENTS

Below, a mode of implementing the present invention is described in detail with reference to the accompanying drawings. In the description of the drawings, the same elements are labeled with the same reference numerals, and repeated description is omitted.

Figure 2:
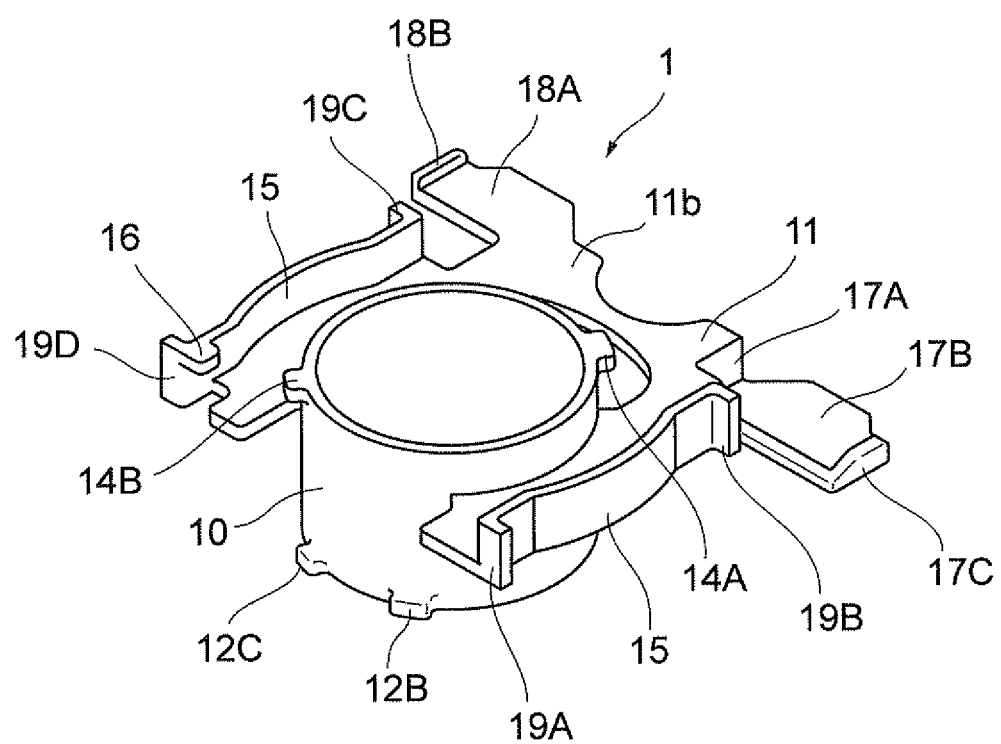
FIG. 2 is a perspective diagram from a bottom surface side of the coil bobbin in FIG. 1.

FIG. 1 is an exploded perspective diagram showing a coil bobbin relating to the present embodiment, and a first coil winding which is installed on the coil bobbin. FIG. 2 is a perspective diagram from a bottom surface side (rear surface side) of the coil bobbin in FIG. 1. Furthermore, (a) of FIG. 3 is a plan diagram of a coil bobbin, and (b) of FIG. 3 is a front view diagram of a coil bobbin (a diagram viewed from the X direction in FIG. 1). Moreover, (a) of FIG. 4 is a bottom surface diagram of a coil bobbin and (b) of FIG. 4 is a rear surface diagram of a coil bobbin. The detailed composition of the first coil winding shown in FIG. 1 is described below.

A coil component constituted by the coil bobbin 1 shown in FIG. 1 and the first coil winding 2 is used in an inductance element, a switching power source apparatus, a noise filter, an inverter, or the like. The coil component includes a second coil winding 3, a connection member 4, and a pair of magnetic core members 5A, 5B, in addition to the coil bobbin 1 and the first coil winding 2 described above. The composition of these elements is described below.

The respective parts which constitute the coil component 1 described above will now be explained, together with the method of assembly of the coil component 1.

(Coil Bobbin)

Firstly, the composition of the coil bobbin 1 included in the coil component relating to the present embodiment will be described with reference to FIG. 1 to FIG. 4. The coil bobbin 1 is made of an insulating material, such as resin, and is constituted by a tubular section 10, a flange section 11 which is provided in substantially the central portion of the tubular section 10 and which projects outwards with respect to the axis line A, and projecting sections 12A to 12C, 13, 14A and 14B. Of these parts, the projecting sections (first projecting sections) 12A to 12C and the projecting section (second projecting section) 13 are provided on an upper side of the flange section 11 as depicted in FIG. 1, and the projecting sections (third projecting sections) 14A, 14B are provided on a lower side (bottom surface side) of the flange section 11 as depicted in FIG. 1, Moreover, the projecting sections 12A to 12C are provided on the upper side end portion of the tubular section 10 as depicted, and the projecting section 13 is provided in substantially a central portion of the tubular section 10, at a position between the upper side end portion of the tubular section 10 and the flange section 11. The position where the projecting section 13 is provided is determined by the shape of the first coil winding (the thickness of the winding, etc.) which is described hereinafter. As shown in (a) of FIG. 3, the projecting sections 12A to 12C and the projecting section 13 are provided at mutually different positions when viewed from above along the axis line A. Furthermore, the projecting sections 14A, 14B are provided respectively on a lower side end portion of the tubular section 10.

The flange section 11 is a member which is flat and projects outwards from the tubular section 10, and functions as spacer that insulates the first coil winding 2 and the second coil winding 3. Furthermore, the flange section 11 is provided with a region having a larger outer diameter than the first coil winding 2 and the second coil winding 3, when viewed along the direction of the axis line A. The flange section 11 has a side wall section 15 which extends downwards along the direction of the axis line A on the outer side of the flange section. This side wall section has a substantially circular arc shape which corresponds to the shape of the second coil winding 3, as described hereinafter, and has a function for maintaining insulation between the second coil winding 3 and a core member 5A which is described hereinafter. Moreover, as shown in FIG. 2, a hook section 16 which projects in the direction of the axis line A is provided on a lower end portion of the side wall section 15. As shown in (b) of FIG. 3, this hook section 16 is provided at the same height as the lower projecting sections 14A and 14B.

Moreover, as shown in FIG. 1 and FIG. 3, a cover section (spacer section) 17B extending in a plane perpendicular to the direction of the axis line A is provided on the upper side of the flange section 11 in the height direction. A wall section 17A which connects between the cover section 17B and the flange section 11 is provided along the direction of the axis line A. Moreover, a hook section 17C which projects downwards is provided on the outer side end portion of the cover section 17B with respect to the axis line A. The function of these elements is described below. As shown in (b) of FIG. 3, a substantially square U-shaped region is formed by the wall section 17A, the cover section 17B and the hook section 17C, and this has a function of securing the first coil winding 2 which is described below (rotation restricting means, reversal restricting means).

Furthermore, a cover section (spacer section) 18A which projects outwards is provided in the flange section 11 in a separate region from the side wall section 15, and a hook section 18B which projects downwards from the outside end portion of the cover section 18A is also provided. This hook section 18B has a function of securing the second coil winding 3, which is described hereinafter.

Leg sections 19A to 19D for engaging the coil bobbin 1 with the core members 5A, 5B are provided in an integrated fashion in the end portion of the side wall section 15. The leg sections 19A to 19D have a shape that corresponds to the shape of the core members 5A, 5B.

When a coil bobbin 1 having the composition described above is viewed in the direction of the central axis line A of the tubular section 10 (the upper side in FIG. 1), then as shown in (a) of FIG. 3, the tubular section 10, the projecting sections 12A to 12C, 13, 14A, 14B and the flange section 11 and the cover section 17B do not have any mutually overlapping portions. Therefore, the coil bobbin 1 can be manufactured readily by injection molding of an insulating resin, using a die.

(First Coil Winding)

Next, a first coil winding 2 shown in FIG. 1 will be described with reference to FIGS. 1, 5 and 6. (a) of FIG. 5 is a plan view diagram of the first coil winding in FIG. 1, (b) of FIG. 5 is a bottom surface diagram of the first coil winding and FIG. 6 is a side view diagram of the first coil winding.

As shown in FIG. 1 and FIG. 5, the first coil winding 2 substantially has a circular ring shape which is formed by joining together two winding members 21, 22, each shaped as a ring with an end, which are situated in parallel at a distance apart and are joined together so as to connect in a prescribed winding direction. A "substantially circular ring shape" means that, of the coil winding, the outer circumference of the region forming the winding (in other words, the region apart from the terminal sections or the connecting section, and the like) has an approximately circular shape, or an approximately elliptical shape, when viewed in the direction of the axis line A. The winding members 21, 22, which are shaped as a ring with an end, take the form of the letter C and have a circular opening 201, 202 in the center thereof. The wiring member 21 and the wiring member 22 are mutually overlapped in such a manner that these openings 201 and 202 are connected. A slit 23 and a slit 24 are respectively provided in the winding member 21 and the winding member 22, but these slits are mutually overlapping at staggered positions when viewed in the axis line direction (in other words, so as not be connected). The slit 24 is a slit into which the projecting section 13 passes when the first coil winding 2 is installed on the coil bobbin 1.

Moreover, a first terminal section 25 which projects outwards from the axis line A of the opening 201 is provided in an integrated fashion on one end portion of the winding member 21. The other end portion of the winding member 21 is connected to one end portion of the winding member 22 via a U-shaped connecting section 26. A second terminal section 27 which projects outwards from the axis line A of the opening 202 is provided in an integrated fashion on the other end portion of the winding member 22. In the first coil winding 2 which has the composition described above, the first terminal section 25 is a starting end of the first coil winding 2, and the second terminal section 27 is a final end of the first coil winding 2. When electric power is input to the first terminal section 25, the power flows sequentially through the winding member 21, the connecting section 26 and the winding member 22, and is output from the second terminal section 27.

Moreover, a heat radiating section (heat radiating terminal) 28 which projects outwards from the axis line A is provided in the winding member 22. This heat radiating section 28 has a function of fixing the first coil winding 2 and the coil bobbin 1 so as not to become detached due to vibration, and the details thereof are described hereinafter.

A plurality of notch sections 211, 212, 213 (in the present embodiment, three notch sections) which are cut in an outward direction are formed in the internal circumference of the winding member 21. The notch sections 211 to 213 are arranged in a mutually separate fashion along the circumferential direction of the opening 201.

Furthermore, a plurality of notch sections 221, 222, 223 (in the present embodiment, three notch sections) which are cut in an outward direction are formed in the internal circumference of the winding member 22. The notch sections 221 to 223 are arranged in a mutually separate fashion along the circumferential direction of the opening 202. The notch sections 211 to 213 of the winding member 21 and the notch sections 221 to 223 of the winding member 22 are provided at overlapping positions when viewed in the direction of the axis line A, as shown in FIG. 1 and FIG. 5. The notch sections 211 to 213 and the notch sections 221 to 223 are provided at positions corresponding to the projecting sections 12A to 12C which are provided on the tubular section 10 of the coil bobbin 1.

The first coil winding 2 which has the composition described above can be formed by punching out from a single sheet having high electric conductivity. More specifically, a first terminal section 25, winding members 21, 22 which connect to the first terminal section 25, a second terminal section 27 which connects to the winding member 22, a heat radiating section 28 which extends from the winding member 22, and an I-shaped connecting section 26 which connects the winding members 21, 22, can be processed by punching out from a sheet of copper or aluminum, or the like. The winding members 21 and 22 are mutually superimposed at a prescribed gap apart by bending the connecting section 26 in a U shape. By this means, a first coil winding 2 consisting of conductive plate is completed. The first coil winding 2 is not limited to a bent coil of this kind; for example, it may also be formed by screw fastening or welding together a coil member and a connecting section. Furthermore, these elements may also be fixed by rivets.

(Installing the First Coil Winding on the Coil Bobbin)

Next, the installation of the first coil winding 2 on the coil bobbin 1 will be described with reference to FIG. 1 and FIG. 7. FIG. 7 is a diagram which describes a method of installing a first coil winding on a coil bobbin, and corresponds to a plan diagram of the coil bobbin and the first coil winding.

As shown in FIG. 1, the rear surface of the winding 22 (the bottom surface side in FIG. 1), of the first coil winding 2, is set to correspond to the end side (first end side) of the coil bobbin 1, where the projecting sections 12A to 12C and 13 are provided. The position of the projecting section 12A of the coil bobbin 1 is matched to the notch sections 211, 221 of the winding members 21, 22. By matching these positions, the projecting section 12B is matched to the position of the notch sections 212, 222, and the projecting section 12C is matched to the position of the notch sections 213, 223. Furthermore, the positions of the projecting section 13 of the coil bobbin 1 and the slit 24 of the winding member 22 are also matched. After matching the positions, the first coil winding 2 and the coil bobbin 1 are moved relatively, and the tubular section 10 of the coil bobbin 1 is inserted in the direction of the central axis line A of the tubular section 10, into the openings 201, 202 of the winding members 21, 22. As the tubular section 10 is inserted, the projecting sections 12A to 12C pass into the notch sections 211 to 213 and 221 to 223 and the projecting section 13 passes into the slit 24.

When the tubular section 10 is inserted, the flange section 11 of the coil bobbin 1 abuts against the rear surface of the winding member 22. By this means, it becomes impossible to insert the coil bobbin 1 further, and hence the coil bobbin 1 assumes the state shown in (a) of FIG. 7. In this state, the projecting sections 12A to 12C of the coil bobbin 1 project slightly from the notch sections 211 to 213 of the winding member 21. Furthermore, the projecting section 13 is positioned between the winding member 21 and the winding member 22.

Next, the coil bobbin 1 is rotated relatively with respect to the first coil winding 2. (b) of FIG. 7 is a diagram showing a state where the coil bobbin 1 is rotated through approximately 180 degrees with respect to the coil winding 2.

More specifically, the coil bobbin 1 is rotated leftwards when viewed from above in FIG. 1. When this rotation starts, the projecting section 12A of the coil bobbin 1 leaves the notch section 211 of the winding member 21, and the projecting sections 12B, 12C also leave the notch sections 212, 213 of the winding member 21. When the coil bobbin 1 is rotated through 180 degrees, the heat radiating section 28 of the winding member 22 enters in below the cover section 17B of the coil bobbin 1. In this case, although there is a hook section 17C which projects from the cover section 17B, the cover section 17B which is made of an insulating resin flexes, and hence the heat radiating section 28 enters below the cover section 17B. The wall section 17A of the coil bobbin 1 abuts against the heat radiating section 28 of the winding member 22. Due to the heat radiating section 28 abutting against the wall section 17A, further rotation in this direction is restricted. In other words, the wall section 17A functions as rotation restricting means. Furthermore, when the heat radiating section 28 abuts against the wall section 17A, the whole of the heat radiating section 28 enters in below the cover section 17B, and therefore the flexion of the cover section 17B returns to its original state, and the hook section 17C covers a portion of the outside of the heat radiating section 28 in the direction of the axis line A. As a result of this, rotation of the first coil winding 2 in the reverse direction with respect to the coil bobbin 1 is restricted by the hook section 17C. More specifically, the hook section 17C functions as reversal restricting means. In this case, as shown in (b) of FIG. 7, the winding members 21, 22 of the first coil winding 2 are formed with a smaller external diameter than the flange section 11.

In this case, insulation between the winding member 21 and the winding member 22 is achieved by the projecting section 13 of the coil bobbin 1. Moreover, by rotating the coil bobbin 1 with respect to the first coil winding 2, as shown in (b) of FIG. 7, the projecting sections 12A to 12C of the coil bobbin 1 and the notch sections 211 to 213 of the winding member 21 assume mutually different positions when viewed in the direction of the axis line A, and therefore movement of the first coil winding 2 in the direction of the axis line A is also restricted by the projecting sections 12A to 12C.

(Second Coil Winding)

Next, the second coil winding will be described with reference to FIG. 8 and FIG. 9. FIG. 8 is a diagram for describing the composition of a component in which a first coil winding is installed on a coil bobbin, and the composition of a second coil winding. (a) of FIG. 9 is a plan diagram of a second coil winding and (b) of FIG. 9 is a bottom surface diagram of a second coil winding.

As shown in FIG. 8 and FIG. 9, the second coil winding 3 has a substantially circular ring shape and is constituted by a winding member 31 shaped as a ring with an end. This winding member 31 is in the form of the letter C and has a circular opening 301 in the center thereof. Moreover, the winding member 31 is a one-turn winding, and a third terminal section 32 which projects outwards from the axis line A of the opening 301 is provided in an integrated fashion on one end portion of the winding member 31. A fourth terminal section 33 which projects outwards from the axis line A of the opening 301 is provided in an integrated fashion on the other end portion of the winding member 31. A slit 34 is provided between the third terminal section 32 and the fourth terminal section 33.

Moreover, a heat radiating section (heat radiating terminal) 35 which projects outwards from the axis line A is provided on the winding member 31. This heat radiating section 35 is a region for ensuring the width of the winding member 31 (cross-sectional area), as well as functioning as a member for raising the heat radiating properties from the second coil winding 3.

A plurality of notch sections 311, 312 (in the present embodiment, two notch sections) which are cut in an outward direction are formed in the internal circumference of the winding member 31. The notch sections 311 and 312 are arranged in a mutually separate fashion along the circumferential direction of the opening 301.

The second coil winding 3 which has the composition described above can be formed by punching out from a single sheet having high electric conductivity.

(Installing the Second Coil Winding on the Coil Bobbin)

Next, the installation of the second coil winding on a component constituted by the coil bobbin and the first coil winding will be described with reference to FIGS. 8, 10, 11 and 12. FIG. 10 is a diagram for describing a method of installing a second coil winding on a component constituted by a coil bobbin and a first coil winding. Furthermore, FIG. 11 is a diagram for describing a method of connecting a first coil winding and a second coil winding, and FIG. 12 is a perspective diagram of a bottom surface side of a coil constituted by a coil bobbin, a first coil winding and a second coil winding.

As shown in FIG. 8, the rear surface of the second coil winding 3 (the bottom surface side in FIG. 8) is made to correspond to the end section side (second end section side) of the coil bobbin 1 where the projecting sections 14A, 14B are provided. The position of the projecting section 14A of the coil bobbin 1 is matched to the notch section 311 of the winding member 31. By matching these positions, the projecting section 14B is matched in position to the notch section 312. After positional alignment, the second coil winding 3 and the coil bobbin 1 are moved relatively, and the tubular section 10 of the coil bobbin 1 is inserted into the opening 301 of the winding member 31, in the direction of the central axis line A of the tubular section 10. With this insertion of the tubular section 10, the projecting sections 14A, 14B pass into the notch sections 311, 312. By this means, the surface 11$b$ of the flange section 11 of the coil bobbin 1 abuts against the rear surface of the winding member 31. Consequently, it becomes impossible to insert the coil bobbin 1 further, and hence the coil bobbin 1 assumes the state shown in (a) of FIG. 10. In this case, the side wall section 15 of the coil bobbin 1 assumes a position covering the outer circumferential edge of the second coil winding 3 (see (a) of FIG. 10).

Next, the second coil winding 3 is rotated relatively with respect to the component 1A constituted by the coil bobbin 1 and the first coil winding 2. (b) of FIG. 10 is a diagram showing a state where the second coil winding 3 has been rotated through approximately 10 degrees with respect to the component 1A.

More specifically, the second coil winding 3 is rotated rightwards as viewed from the upper side in FIG. 8. Due to this rotation, the projecting section 14A of the coil bobbin 1 leaves the notch section 311 of the winding member 31, and the projecting section 14B also leaves the notch section 312 of the winding member 31. When the second coil winding is rotated through 10 degrees, the heat radiating section 35 of the winding member 31 moves until reaching a position superimposed over the cover section 18A of the coil bobbin 1. In this case, although there is a hook section 18B which projects from the cover section 18A, the cover section 18A which is made of insulating resin flexes, and therefore the heat radiating section 28 can ride up over the hook section 18B and become superimposed over the cover section 18A. Furthermore, in this case, the region of the winding member 31 which extends to the fourth terminal section 33 abuts against the side wall section 15, and moreover, the winding member 31 also enters in below the hook section 16 provided in the side wall section 15. Accordingly, further rotation in this direction is suppressed. In other words, the side wall section 15 functions as rotation restricting means. Furthermore, when the winding member 31 abuts against the side wall section 15, the heat radiating section 35 moves until completely riding over the hook section 18B, and therefore the flexion of the cover section 18A returns to the original shape and the hook section 18B covers the outside portion of the heat radiating section 35 when viewed in the direction of the axis line A. As a result of this, rotation of the second coil winding 3 in the reverse direction with respect to the coil bobbin 1 is restricted by the hook section 18B. More specifically, the hook section 18B functions as reversal restricting means. In this case, as shown in (b) of FIG. 10, the second coil winding 3 is accommodated to the inner side of the side wall section 15.

Furthermore, by rotating the second coil winding 3 with respect to the coil bobbin 1, as shown in (b) of FIG. 10, the projecting sections 14A and 14B of the coil bobbin 1 and the notch sections 311 and 312 of the winding member 31 assume mutually different positions when viewed in the direction of the axis line A, in addition to which the winding member 31 enters in below the hook section 16, and therefore movement of the second coil winding 3 in the direction of the axis line A is also restricted by the projecting sections 14A and 14B.

By rotating the second coil winding 3 with respect to the coil bobbin 1, the second terminal section 27 of the first coil winding 2 and the third terminal section 32 of the second coil winding 3 assume mutually overlapping positions when viewed in the direction of the axis line A. Therefore, by electrically connecting the second terminal section 27 of the first coil winding 2 and the third terminal section 32 of the second coil winding 3, by a screw (connecting member) 4, as shown in FIG. 11, the first coil winding 2 and the second coil winding 3 function as a coil winding having a total of three turns. More specifically, when power is input to the first terminal section 25 of the first coil winding 2, the power arrives at the second terminal section 27 by passing along the winding member 21, the connecting section 24 and the winding member 22, and then passes along the winding member 31 from the third terminal section 32 of the second coil winding 3 which is electrically connected to the second terminal section 27, arrives at the fourth terminal section 33, and is then output from the fourth terminal section 33.

Furthermore, by fixing the second terminal section 27 of the first coil winding 2 and the third terminal section 32 of the second coil winding 3 by the screw 4, movement of the first coil winding 2 and the second coil winding 3 on the outer side of the tubular section 10 is restricted. Rather than using screw fixing, the coil windings may be connected by welding. Furthermore, the coil windings may also be fixed by rivets.

By the foregoing, a coil 1B consisting of a coil bobbin 1, a first coil winding 2, a second coil winding 3 and a screw 4 serving as a connecting member is formed.

FIG. 13 shows a front view diagram of the coil 1B (a view in the X direction in FIG. 1). As shown in FIG. 13, in the coil 1B, the projecting section 13 of the coil bobbin 1 is provided between the winding member 21 and the winding member 22 of the first coil winding 2, thereby achieving insulation. Moreover, a flange section 11 is provided between the winding member 22 and the second coil winding 3 (winding member 31), thereby achieving insulation. Furthermore, projecting sections 12A to 12C are provided above the winding member 21 (only the projecting section 12A is shown in FIG. 13), thereby suppressing upward movement of the winding member 21. Furthermore, projecting sections 14A and 14B (only the projecting section 14A is shown in FIG. 13) and the hook section 16 are provided below the winding member 31, thereby suppressing downward movement of the winding member 31.

(Coil Component)

Next, a coil component 1C will be described with reference to FIG. 14. FIG. 14 is an exploded perspective diagram for illustrating the composition of a coil component. In this coil component 1C, the coil 1B described above is also provided with a pair of magnetic core members 5A and 5B. The coil component 1C functions, for example, as a choke coil of the switching power source apparatus described below.

As shown in FIG. 14, the magnetic core members 5A, 5B are arranged so as to sandwich the coil 1B along the axis line A and pass through the opening of the coil bobbin 1 constituting the coil 1B.

The magnetic core members 5A, 5B each respectively constitute a so-called E-shaped core which is obtained by compacting a ferrite powder. More specifically, the magnetic core member 5A consists of a flat plate-shaped base section 50 having a lengthwise direction, a circular rod-shaped main leg 51 which is provided in a projecting fashion in the center of one main surface of the base section 50, and two outer legs 52, 53 provided at end portions of the base section 50 on either side of the main leg 51. Furthermore, the magnetic core member 5B is also constituted by a base section 54, a main leg 55 and two outer legs 56, 57.

The main legs 51, 55 of the magnetic core members 5A, 5B are inserted into the opening of the coil 1B, in other words, the openings 201 and 202 of the tubular section 10 of the coil bobbin 1. In this case, the first coil winding 2 and the second coil winding 3 are provided on the outside of the tubular section 10, and therefore the main legs 51, 55 do not contact these windings.

Furthermore, the outer legs 52, 53 of the magnetic core member 5A and the outer legs 56, 57 of the magnetic core member 5B are arranged about the outer circumference of the first coil winding 2 and the second coil winding 3 in such a manner that the outer leg 52 of the magnetic core member 5A and the outer leg 56 of the magnetic core member 5B abut against each other and furthermore the outer leg 53 of the magnetic core member 5A and the outer leg 57 of the magnetic core member 5B abut against each other. In this case, since the flange section 11 of the coil bobbin 1 is larger than the first coil winding 2 and furthermore the side wall section 15 is formed on the outer side of the second coil winding 3, then the flange section 11 and the side wall section 15 function as an insulating member which prevents contact between the magnetic core members 5A, 5B, and the first coil winding 2 and the second coil winding 3.

The projecting sections 12A to 12C in the coil bobbin 1 function as insulating members for preventing abutment between the magnetic core member 5A and the winding member 21, and the projecting sections 14A and 14B and the hook section 16C function as insulating members for preventing abutment between the magnetic core member 5B and the winding member 31.

Moreover, outwardly projecting guide sections 19A to 19D are provided on the flange section 11 of the coil bobbin 1, and these guide sections 19A to 19D fix the outer legs 56, 57 of the magnetic core member 5B, thereby suppressing the occurrence of positional displacement between the magnetic core member 5B and the coil 1B, in the width direction. The shape of the guide sections 19A to 19D is not limited to that described above, and may be varied appropriately in accordance with the shape of the magnetic core members.

(Switching Power Source Apparatus)

Next, a switching power source apparatus in which the coil component 1 relating to the present embodiment is desirably used will now be described. FIG. 15 is a circuit diagram of a switching power source apparatus 100. Furthermore, FIG. 16 is a perspective diagram of a switching power source apparatus 100. The switching power source apparatus 100 relating to the present embodiment functions as a DC-DC converter which, for instance, converts a high-voltage DC input voltage Vin supplied from a high-voltage battery, or the like, storing a voltage of approximately 100 V to 500 V, into a low-voltage DC output voltage Vout, and supplies this voltage Vout to a low-voltage battery, or the like, storing a voltage of approximately 12 V to 16 V.

As shown in FIG. 16, the switching power source apparatus 100 has a base plate 101, and secured to this base plate, an input smoothing capacitor (input filter) 130, a switching circuit 120, a main transformer 140, a rectifying circuit 150, and a smoothing circuit 160 constituted by a choke coil (coil component) 170 and an output smoothing capacitor 162.

More specifically, the switching power source apparatus 100 comprises a switching circuit 120 and an input smoothing capacitor 130 provided between a primary side high-voltage line 121 and a primary side low-voltage line 122, a main transformer 140 having a primary side and a secondary side transformer coil section 141, 142, a rectifying circuit 150 which is connected to the secondary side transformer coil section 142, and a smoothing circuit 160 which is connected to the rectifying circuit 150.

The switching circuit 120 has a full bridge-type circuit composition, which is constituted by switching elements S1 to S4. The switching circuit 120 converts a DC input voltage Vin which is applied between the input terminals T1 and T2, into an input AC voltage, in accordance with a drive signal supplied from a drive circuit (not illustrated), for instance.

The input smoothing capacitor 130 smoothens a DC input voltage Vin which is input from the input terminals T1, T2. The main transformer 140 transforms the level of the input AC voltage generated by the switching circuit 120 and outputs an output AC voltage. The winding ratio of the primary side and the secondary side transformer coil sections 141, 142 is set appropriately with the voltage transformation ratio. Here, the number of windings of the primary side transformer coil section 141 is set to be greater than the number of windings of the secondary side transformer coil section 142. The secondary side transformer coil section 142 is a center tap type of coil, which is wired to the output terminal T3 via a connecting section C and an output line LO.

The rectifying circuit 150 is a single-phase full-wave rectifying circuit consisting of rectifying diodes 151A and 151B. The cathodes of the rectifying diodes 151A and 151B are connected to the secondary side transformer coil section 142, whereas the anodes are connected to a ground line LG and wired to the output terminal T4. By this means, the rectifying circuit 150 individually rectifies each half wave period of the output AC voltage from the main transformer 140 so as to generate a DC voltage.

The smoothing circuit 160 is constituted by a choke coil 170 and an output smoothing capacitor 162. The choke coil 170 is inserted into the output line LO. The output smoothing capacitor 162 is connected between the choke coil 170 and the ground line LG in the output line LO. Therefore, the smoothing circuit 160 generates a DC output voltage Vout by smoothing the DC voltage which has been rectified by the rectifying circuit 150, and supplies this DC output voltage Vout to a low-voltage battery, or the like, from the output terminals T3, T4.

In the switching power source apparatus 100 which is composed as described above, the DC input voltage Vin supplied from the input terminals T1, T2 is switched to generate an input AC voltage, which is supplied to the primary side transformer coil section 141 of the main transformer 140. The generated input AC voltage is transformed and output as an output AC voltage from the secondary side transformer coil section 142. This output AC voltage is rectified by the rectifying circuit 150 and smoothed by the smoothing circuit 160, and is then output as a DC output voltage Vout from the output terminals T3, T4.

In the switching power source apparatus 100 described above, the coil windings become hot when the coil component 1C relating to the present embodiment is installed and driven, and therefore it is necessary to provide heat radiating means. Therefore, in the coil component 1C relating to the present embodiment, the heat radiating section 28 provided in the winding member 22 of the first coil winding 2 and the heat radiating section 35 provided in the winding member 31 of the second coil winding 3 function as effective heat radiating means.

This composition is described in more concrete terms below with reference to FIG. 17 and FIG. 18. FIG. 17 is an exploded perspective diagram when the heat radiating member is installed on the coil component, and FIG. 18 is a perspective diagram of the coil component in which the heat radiating member has been installed.

More specifically, when the coil component 1C is arranged on the frame of the switching power source apparatus 100, heat radiating sheets 9A and 9B are provided below the heat radiating section 28 and the heat radiating section 35, as illustrated in FIG. 17 and FIG. 18. A pressing member 8A having elastic properties for respectively pressing the upper parts of the cover section 17B which covers the heat radiating section 28 and the cover section 18A which covers the heat radiating section 35 is placed thereon, and is fixed to the frame (heat radiating object) by a screw 8B. The coil component formed by combining these elements is the coil component 1D shown in FIG. 18. In this case, the center of the pressing member 8A is fixed to the frame by the screw 8B, and due to flexion of the respective ends of this pressing member 8A, the heat radiating section 28 and the heat radiating section 35 are pressed against the frame via the heat radiating sheets 9A and 9B. By this means, the heat generated by the first coil winding 2 can be radiated to the frame via the heat radiating section 28, in addition to which the heat generated by the second coil winding 3 can be radiated to the frame via the heat radiating section 35.

In general, in order to radiate heat from coil windings, heat radiation is performed by thermally connecting the coil windings with a frame, or the like, via an insulating member, such as a heat radiating sheet. Here, a method of respectively fixing the heat radiating sections 28 and 35 which form heat radiating terminals by screw fastening to the frame is employed as a method of achieving thermal connection. In this case, an insulating spacer is required in order to achieve insulation between the screw and the heat radiating terminals. On the other hand, in the coil component 1C relating to the present embodiment, the pressing member 8A is composed so as to press against the frame by pressing the heat radiating sections 28, 35 forming heat radiating terminals via the cover sections 17B and 18A of the coil bobbin 1. Therefore, a spacer for achieving insulation between the screw and the heat radiating terminals is not required, and furthermore, a larger surface area can be ensured for the heat radiating terminals which are connected thermally to the frame, since no screw hole is required therein. Consequently, the heat radiating properties can be further improved.

As described above, according to the coil bobbin, the coil component and the switching power source apparatus relating to the present embodiment, the adjacent winding members 21, 22 of the first coil winding 2 are insulated from each other by the projecting section 13. Furthermore, the first coil winding 2 and the second coil winding 3 are insulated from each other by the flange section 11. Moreover, the projecting sections 12A to 12C and the projecting sections 14A and 14B are respectively provided in positions at either end when the first coil winding 2 and the second coil winding 3 are viewed in a direction perpendicular to the direction of the axis line A. Consequently, even with a coil winding having three turns, insulation between the windings is achieved by means of this coil bobbin 1, and furthermore, insulation is also achieved in the region outside the coil windings as viewed in a direction perpendicular to the axis line direction, thereby making it possible to improve the insulating properties without increasing the number of parts.

Moreover, by making the flange section 11 larger than the outer diameter of the coil windings and providing a side wall section 15 which extends in the direction of axis line A from the outer circumferential edge of the flange section 11, then it is possible to achieve insulating properties between the coil windings and members such as the magnetic core members, and the like, provided to the outside thereof, as well as achieving stability when installing the coil windings on the coil bobbin.

By providing a hook section 16 which extends in the direction of the axis line A from the side wall section 15, the hook section 16 presses in the second coil winding 3, which is provided in the direction of extension of the side wall section 15, when viewed from the direction perpendicular to the direction of the axis line A, and therefore it is possible to suppress vibration of the second coil winding 3 in the direction of the axis line A with respect to the coil bobbin 1.

Furthermore, in the coil bobbin 1 described above, the wall section 17A and the side wall section 15 function as rotation restricting means for restricting rotation of the coil winding in one direction. Accordingly, it is possible to prevent the coil windings from coming into contact with other components, for example, due to rotating about the perimeter of the tubular section 10 of the coil bobbin 1, and hence the insulating properties can be raised further.

Moreover, since the hook section 17C and the hook section 18B function as reversal restricting means for restricting rotation of the coil windings in the direction opposite to the one direction described above, then rotation of the coil windings in the opposite direction is also suppressed and the coil windings can be fixed more appropriately at a prescribed position.

Furthermore, in the coil bobbin 1 described above, cover sections 17B and 18A are provided as spacer sections which abut against the heat radiating sections 28 and 35 that form heat radiating terminals, from a direction following the axis line of the tubular section 10. Here, when performing heat radiation from the coil windings, since the cover sections 17B and 18A which abut against the heat radiating terminals when the coil windings are fixed to the heat radiating object function as insulating members, then the radiation of heat from the coil windings is raised without increasing the number of parts.

Furthermore, in the coil component 1D which is provided with the heat radiating means described above, a heat radiating section 28 which is a heat radiating terminal of the first coil winding 2 and a heat radiating section 35 which is a heat radiating terminal of the second coil winding 3 are pressed in the direction of the axis line A via the cover sections 17B and 18A which function as spacer sections. Therefore, these heat radiating terminals are fixed in position and radiation of heat towards the frame, which is the heat radiating object, is performed. Here, the heat radiating terminals are fixed to the heat radiating object by pressing of the heat radiating terminals, and therefore it is possible to increase the contact surface area and further raise the heat radiating properties compared to a case where the heat radiating terminals are provided with screw holes and are fixed by screws, for example.

An embodiment of the present invention was described above, but the present invention is not limited to the embodiment given here and may be modified in various ways. For example, the shape of the flange section 11 is not limited to that described above and may be modified appropriately.

Furthermore, the notch sections 211 to 213, 221 to 223, 311 and 312 were taken to have a substantially square shape in the embodiment described above, but the notch sections are not limited to having this shape and it is possible to provide V-shaped notches or notches with sloping sides. In this case, the shape of the projecting sections 12A to 12C, 14A and 14B should be matched to the shape of the notch sections 211 to 213, 221 to 223, 311 and 312.

Furthermore, the angles of the notch sections 211 to 213, 221 to 223 in the first coil winding 2 may all be equal, but as described in the embodiment given above, desirably, the notch sections are provided in positions which do not have rotational symmetry. By arranging the notch sections in this way, installation becomes easier, because the projecting sections 12A to 12C and the notch sections 211 to 213 do not all become superimposed with each other again during the fitting of the coil bobbin 1 onto the first coil winding 2.

Furthermore, in the embodiment described above, the number of turns in the first coil winding 2 is two turns, and the number of turns in the second coil winding 3 is one turn, but the number of turns of the respective windings may be increased. If the number of turns of the coil windings is increased, then desirably, a member which functions as a spacer for achieving insulation between the windings is also provided.

Furthermore, when viewed in the direction perpendicular to the axis line A, at least one of the projecting sections 12A to 12C (first projecting sections), 13 (second projecting section), 14A and 14B (third projecting sections) should be present at each position, and the number of projecting sections may be varied appropriately.

Furthermore, there are no particular restrictions on the shape of the cover sections 17B and 18A. Moreover, the position of the hook section which functions as rotation restricting means and reversal restricting means is not limited to that described above and may be modified appropriately in accordance with the shape of the flange section 11 and the side wall section 15, the shape of the coil windings, and the like.

Furthermore, the shape of the pair of magnetic core members 5A and 5B is not limited to a so-called E-E shape, as indicated in the embodiment described above. For example, it is also possible to use a magnetic core member having an E-I shape, a U-I shape, a U-U shape, or the like. In this case, the winding component relating to the present embodiment can be used appropriately for the leg section about which the coil winding is wound, of the leg sections of the magnetic core member.

Furthermore, the composition of the switching power source apparatus is not limited to that shown in FIG. 15 and FIG. 16. In other words, the coil bobbin 1 relating to the present embodiment is suitable for use in an inverter, for example. Moreover, the coil component 1C (1D) is not limited to use as a choke coil 70 in the switching power source apparatus 100, and is also suitable for use in the main transformer 140.

What is claimed is:

1. An insulating coil bobbin having a tubular section about which two conductive coil windings are wound, the coil bobbin further having:
    a flat-shaped flange section which projects outwards from substantially a central portion of the tubular section in a plane which is perpendicular to an axis line of the tubular section;
    a first projecting section which projects toward outside from the tubular section with respect to the axis line at a position separated from the flange section, the first projecting section projecting further toward outside than a first coil winding, which has two or more turns, of the two coil windings, when the first coil winding is wound on a first end side, this first end side being one end side of the tubular section as divided by the flange section and being the side where the first coil winding is wound;
    a second projecting section, which is provided so as to be sandwiched between adjacent windings when the first coil winding is wound on the first end side and which projects toward outside from the tubular section with respect to the axis line, in a direction different from the first projecting section when viewed in the axis line direction; and
    a third projecting section which projects toward outside from the tubular section with respect to the axis line at a position separated from the flange section, the third projecting section projecting further toward outside than a second coil winding, which is different from the first coil winding, of the two coil windings, and which has one or more turns, when the second coil winding is wound on a second end side, this second end side being a different end side from the first end side of the tubular section and being a side where the second coil winding is wound,
    wherein the flange section has an outer diameter larger than an outer diameter of the coil windings and comprises a side wall section extending in the axis line direction from an outer circumferential edge thereof, and
    a height of the side wall section in the axis line direction is greater than a thickness of a coil winding provided in the direction in which the side wall section extends, and the side wall section further has a hook section which extends in the axis line direction from an end of the side wall section that is different from an end on a side of the flange section.

2. The coil bobbin according to claim 1, further comprising rotation restricting means for restricting rotation in one direction of the coil winding, by abutting against the coil winding when the coil winding is inserted into the tubular section and rotated.

3. The coil bobbin according to claim 2, further comprising reversal restricting means for restricting rotation of the coil winding in a reverse direction at a position where rotation of the coil winding in the one direction has been restricted by the rotation restricting means.

4. A coil component, comprising:
    the coil bobbin according to claim 1;
    a first coil winding which is wound in two or more turns about the axis line;
    a second coil winding which is wound in one or more turns about the axis line;
    a connecting member which connects one end section of the first coil winding with one end section of the second coil winding; and
    a pair of magnetic core members which sandwich the coil windings in the axis line direction.

5. A switching power source apparatus comprising the coil component according to claim 4.

* * * * *